United States Patent

[11] 3,621,361

[72] Inventor Alfred Barth
Holzlistrasse 427, 5300 Turgi, Switzerland
[21] Appl. No. 81,977
[22] Filed Oct. 19, 1970
[45] Patented Nov. 16, 1971
[32] Priority Nov. 10, 1969
[33] Switzerland
[31] 16682/69

[54] DIRECT VOLTAGE TRANSFORMER
4 Claims, 1 Drawing Fig.
[52] U.S. Cl. ................................................. 321/2,
307/17, 321/10, 321/18, 328/232
[51] Int. Cl. ................................................. H02m 3/22
[50] Field of Search .................................... 307/11, 17,
42; 321/2, 10, 14, 18, 20, 45; 328/232

[56] References Cited
UNITED STATES PATENTS
| | | | |
|---|---|---|---|
| 2,722,607 | 11/1955 | Rubin | 328/232 X |
| 2,796,582 | 6/1957 | Cooper et al. | 321/18 X |
| 3,010,062 | 11/1961 | Van Emden | 321/45 X |
| 3,297,936 | 1/1967 | Ruch | 321/18 |
| 3,297,959 | 1/1967 | Massey | 321/18 X |
| 3,412,313 | 11/1968 | Compoly | 321/14 |
| 3,543,130 | 11/1970 | Rennders | 321/2 |

*Primary Examiner*—William M. Shoop, Jr.
*Attorney*—Werner W. Kleeman

ABSTRACT: A direct voltage transformer device embodying a DC-AC inverter means at the input side thereof for delivering a square wave voltage output, said inverter means including a regulating circuit means incorporating an adjustment element for changing the pulse width of said square wave voltage output for maintaining constant the secondary direct voltage. A half-wave rectifier circuit arrangement receives the square wave voltage output of the inverter means. This half-wave rectifier circuit arrangement comprises an input transformer means constituted by a primary winding and a secondary winding, a first rectifier element electrically coupled to one terminal of said secondary winding, a subsequently coupled filter coil and capacitor filter. There is also provided a further transformer means having primary winding means and secondary winding means, wherein said primary winding means constitutes said filter coil. Additional rectifier circuit means are electrically coupled with said secondary winding means of said further transformer means, said additional rectifier circuit means conducting during the blocking periods of said first rectifier element coupled with said one terminal of said secondary winding of said input transformer. A second rectifier element is coupled between the junction point of said first rectifier element and said filter coil and the other terminal of said secondary winding of said input transformer means, this second rectifier element blocking during the conductive periods of said first rectifier element.

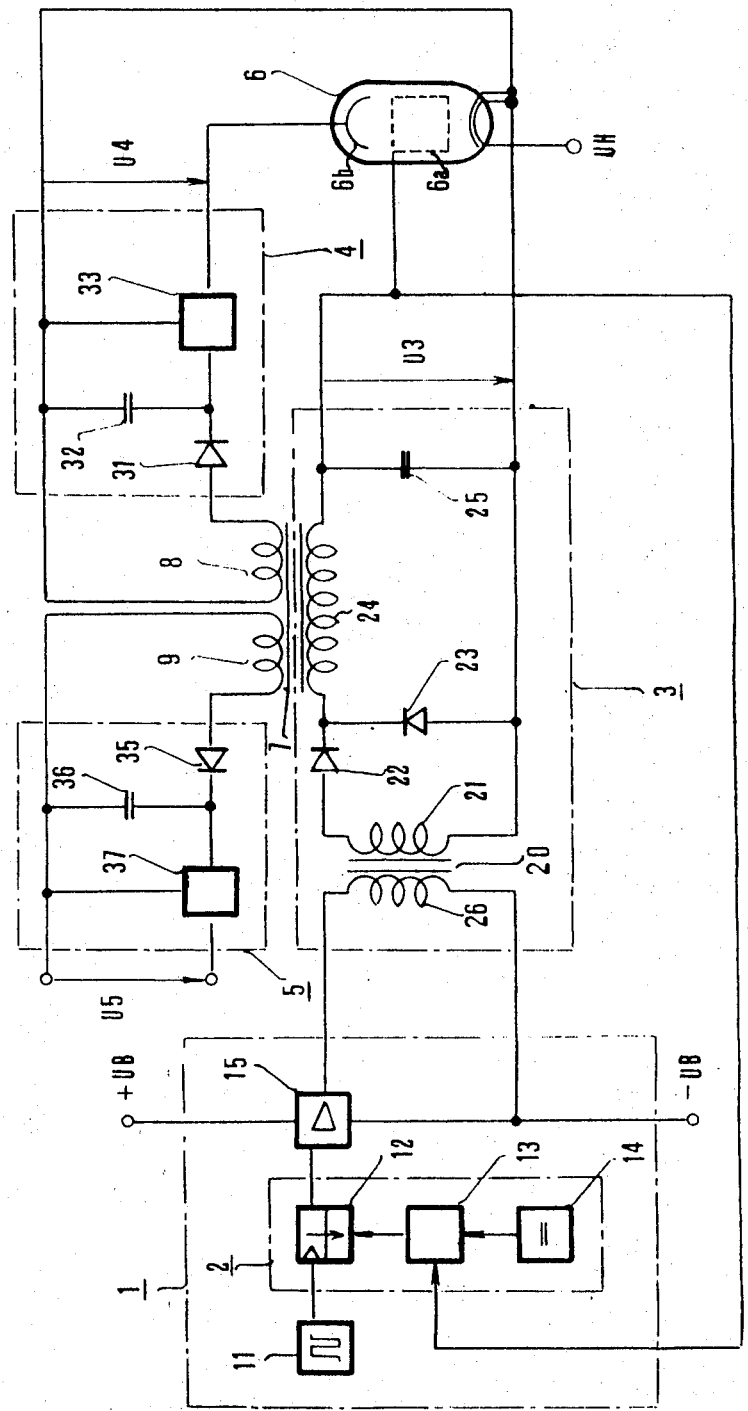
INVENTOR
ALFRED BARTH
BY Werner H. Kleeman
ATTORNEY 3,621,361

DIRECT VOLTAGE TRANSFORMER

BACKGROUND OF THE INVENTION

The present invention relates to a new and improved direct voltage converter or transformer at the input side of which there is provided a DC–AC inverter producing a square-wave voltage, the pulse width of which is variable by means of an adjustment element of a control circuit for the purpose of maintaining constant the secondary direct current voltage, and furthermore, wherein the square-wave voltage is delivered to a half-wave rectifier circuit consisting of an input transformer having a primary winding and a secondary winding and a rectifier element coupled with one terminal of such secondary winding, a subsequently arranged filter coil and a filter capacitor.

In the case of battery-supplied high-frequency devices oftentimes the problem exists of generating supply voltages greater than the battery voltage. Thus, for instance, for the purpose of supplying reflex-Klystron tubes there are required voltages of different magnitude and polarity. Apart from the heated cathode voltage, a positive voltage is to be applied to the resonant cavity and a negative voltage to the repeller plate. These voltages are in the order of magnitude of several hundred volts for Klystron tubes of smaller power, such as for instance the VA 210B tube. Although a current flows in the resonator circuit which is dependent upon the magnitude of the applied voltage and the oscillations of the tube, the repeller plate draws practically no current. Since the power of the generated high-frequency oscillations and the frequency thereof are dependent upon the supply voltages, it is imperative to stabilize these supply voltages if there is to be obtained a stable oscillating condition of the tube.

In heretofore known prior art devices for the generation of the resonant cavity or resonator voltage and the reflector or repeller plate voltage there are provided separate stabilized direct voltage transformers. Yet, this requires large expenditure of equipment having an adverse or disadvantageous affect upon manufacturing costs.

SUMMARY OF THE INVENTION

Accordingly, there is a real need in the art for a direct voltage transformer device capable of delivering a stabilized output. Therefore, a primary objective of the present invention relates to the provision of such direct voltage transformer which effectively fulfills this need.

Another, more specific object of the present invention relates to the provision of a direct voltage transformer, the output of which is sufficiently stabilized so that it can be used as the supply for the resonant cavity and the repeller plate of reflex-velocity modulated tube oscillators.

Still a further significant and even more specific object of the present invention relates to the provision of a new and improved direct voltage transformer device which is of the type incorporating at the input side a DC–AC inverter means for generating a square-wave voltage, the pulse width of which can be varied by means of an adjustment element of a control or regulating circuit for the purpose of maintaining constant the secondary direct voltage, and wherein the square-wave voltage is delivered to a half-wave rectifier circuit comprising an input transformer embodying a primary winding and a secondary winding, a rectifier element connected with one terminal of such secondary winding, a series connected filter coil and a capacitor filter.

Now, in order to implement these and still further objects of the invention, which will become more readily apparent as the description proceeds, the inventive circuit arrangement of the direct voltage transformer device is generally manifested by the features that there is provided as the filter inductance coil the primary winding of a transformer, at the secondary windings of which there are electrically coupled further rectifier circuits which are conductive during the blocking periods of the aforementioned rectifier element. Additionally, at the junction point of such rectifier element with the primary winding connected in the circuit as the filter coil there is coupled with the other terminal of the secondary winding of the input transformer a still further rectifier element, this just-mentioned rectifier element blocking during the conductive periods of the rectifier element connected to the aforesaid one terminal of the secondary winding of said input transformer.

A primary advantage of the new and improved direct voltage transformer of the present invention resides in the fact that apart from being able to produce a first stabilized direct voltage both for variable supply voltages as well as also for variable load currents it is possible to generate further voltages of optional magnitude. Since the above-mentioned further voltages are derived from the first stabilized voltage they are likewise stabilized. The generated voltages appear in galvanically separated circuits.

BRIEF DESCRIPTION OF THE DRAWING

The invention will be better understood, and objects other than those set forth above, will become apparent, when consideration is given to the following detailed description thereof. Such description makes reference to the annexed drawing wherein the single FIG. illustrates a circuit diagram of a preferred embodiment of inventive direct voltage transformer, and specifically for generating the supply voltages of a Klystron tube.

DETAILED DESCRIPTION OF THE PREFERRED EMBODIMENTS

Referring now to the single FIG., there is illustrated therein the circuit diagram of a preferred embodiment of direct voltage transformer or converter which at the input side thereof comprises a DC–AC inverter 1 connected to the terminals +UB and −UB of a battery. Inverter 1 produces a square-wave voltage, the pulse width of which can be varied by means of an adjustment element 12 of a control or regulating circuit 2 for the purpose of maintaining the secondary direct voltage constant. Inverters of this general type are well known in the art, and therefore will only be considered hereinafter to the extent necessary for fully comprehending the underlying concepts of the invention.

In the exemplary embodiment of direct voltage transformer under consideration the actual inverter 1 is composed of an amplifier 15 controlled by a square-wave control voltage. This square-wave control voltage is generated by a monostable relaxation oscillator 12 periodically scanned by an astable relaxation oscillator 11 and the reset time of which can be varied by applying a direct voltage. The amplifier 15 is controlled by the output voltage of the monostable relaxation oscillator 12.

This monostable relaxation oscillator 12 functions as the adjustment element of a control or regulating circuit 2. Regulating circuit 2 embodies a comparator or comparison circuit 13 which compares the direct voltage delivered by the direct voltage transformer with a reference voltage source 14, delivering to the monostable oscillation circuit 12 an error voltage when there is a difference between both voltages. This error voltage causes a change in the pulse width of the square-wave voltages delivered by the monostable relaxation oscillator 12 and by the amplifier 15. The square-wave voltage generated by the DC–AC inverter 1 is delivered to a half-wave rectification circuit 3. Half-wave rectifier circuit arrangement 3 consists of an input transformer 20 having a primary winding 26 and a secondary winding 21, a rectifier element 22 electrically coupled with one terminal of secondary winding 21, a further arranged filter coil 24 and a capacitor filter 25. The primary winding 24 of a further transformer 7 serves as this filter inductance coil. Furthermore, at both secondary windings 8 and 9 of transformer 7 there are coupled the further respective rectifier circuits 4 and 5 which are conductive during the blocking periods of the aforementioned rectifier element 22. Additionally, between the junction point of the rectifier element 22 with the primary winding 24 of the transformer 7 serving as the filter coil and the other terminal of the secondary winding 21 of the input transformer 20 there is electrically coupled a further rectifier element 23 which blocks during the conductive periods of the rectifier element 22.

The DC voltage U3 generated by the half-wave rectifier circuit 3 is delivered to the comparison circuit 13. The stabilized direct voltage U3 can be used to supply a variable load, such as in the present example, the resonant cavity 6a of a Klystron tube 6.

Continuing, it will be understood that the rectifier circuits 4 and 5 each consist of the rectifier elements 31 and 35, respectively, a charging capacitor 32 and 36, respectively, as well as the filter circuits 33 and 37, respectively. The voltage U4 produced by the rectifier circuit 4, in the present embodiment, serves for supplying the repeller plate 6b of the Klystron tube 6 constituting a high-ohm load in comparison to the resonant cavity 6a. The voltage U5 is available for supplying a further high-ohm load.

Having now had the benefit of the foregoing description of the circuitry of the inventive direct voltage converter or transformer, the function thereof will now be considered and is as follows: the astable oscillator circuit 11 delivers a square wave voltage which is supplied to the dynamic input of the monostable oscillator circuit 12. The oscillator circuit 12 cuts into its operating or working state during each forward flank of the square-wave voltage and delivers a voltage at its output. The output voltage again cuts off or disappears as soon as the oscillator circuit 12 returns back into its rest state. Since the reset time is determined by the error voltage delivered by the comparison circuit 13 there appears at the output of the monostable oscillator circuit 12 a square-wave voltage possessing a variable pulse width. By means of this square-wave voltage the amplifier 25 is controlled, amplifier 15 practically functioning as a switch and blocking the terminal or pole +UB of the battery voltage or electrically coupling such to the primary winding 26 of the input transformer 20 of the half-wave rectifier circuit 3.

The input transformer 20 delivers to the secondary winding 21 a square wave AC voltage transformed in accordance with the transformation ratio, this voltage being necessary for producing the direct voltage U3. During the conductive period of the rectifier element 22 a positive current flows through the primary winding 24 of the transformer 7 to the resonant cavity 6a of the tube 6 serving as the load. The inductance of the primary winding 24 serves as a choke coil and together with the capacitor filter 25 forms the filter circuit of the half-wave rectifier circuit arrangement 3. A direct voltage U3 is available at the capacitor filter 25. This voltage U3 is stabilized since for each variation of its magnitude with respect to the reference voltage 14 there results an error voltage which changes the pulse width of the square-wave voltage in such a manner that the reference value of the voltage U3 is again reached. Controls of this type are well known to the art and therefore, beyond that which has been explained herein, it is not thought necessary to further delve into the matter.

Additionally, it will be understood that the windings 8 and 9 of the transformer 7, together with the rectifier elements 31 and 35, respectively, are poled in such a manner that during the conductive periods of the rectifier element 22 no current flows in the secondary windings 8 and 9.

On the other hand, during the blocking periods of the rectifier element 22 the primary winding 24 of the transformer 7 is connected parallel to the filter capacitor 25 by means of the conductive rectifier element 23, and across which capacitor 25 there appears the regulated voltage U3. As a result, the voltage U3 is transformed in accordance with the transformer ratio to the secondary side of the transformer 7. By means of the rectifier elements 31 and 35 and the capacitors 32 and 36 there is undertaken peak value rectification. The peak values of the generated voltages U4 and U5 are equally as well stabilized as the voltage U3. Thus the voltages U4 and U5 are also of the same accuracy as the voltage U3.

In order to insure for good regulation the load of the voltage U4 and U5 must be calculated such that it is considerably smaller than the load of the voltage U3, but on the other hand there is no requirement that these loads be constant.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. A direct voltage transformer device, comprising a DC–AC inverter means at the input side thereof for delivering a square-wave voltage output, said inverter means including a regulating circuit means embodying an adjustment element for changing the pulse width of said square-wave voltage output for maintaining constant the secondary direct voltage, a half-wave rectifier circuit arrangement for receiving said square-wave voltage output of said inverter means, said half-wave rectifier circuit arrangement comprising an input transformer means incorporating a primary winding and a secondary winding, a rectifier element electrically coupled to one terminal of said secondary winding, a subsequently coupled filter coil and capacitor filter, a further transformer means having primary winding means and secondary winding means, said primary winding means providing said filter coil, rectifier circuit means electrically coupled with said secondary winding means of said further transformer means, said rectifier circuit means conducting during the blocking periods of said rectifier element coupled with said one terminal of said secondary winding of said input transformer means, said half-wave rectifier circuit arrangement including a further rectifier element connected between the junction point of said rectifier element connected between said one terminal of said secondary winding of said input transformer means and said filter coil and the other terminal of said secondary winding of said input transformer means, said further rectifier element blocking during the conductive periods of said rectifier element connected between said one terminal of said input transformer means and said filter coil.

2. A direct voltage transformer device as defined in claim 1, said secondary winding means of said further transformer means incorporating first and second secondary windings, said rectifier circuit means coupled with said secondary winding means including a first and second rectification circuit coupled with said first and second secondary windings, each said rectification circuit including a rectifier element, capacitor means and filter circuit means.

3. A direct voltage transformer device as defined in claim 1, wherein said regulating circuit means comprises monostable oscillator means defining said adjustment element, a comparator, a reference voltage means for delivering a reference voltage value to said comparator, and means for delivering the secondary direct voltage to said comparator, said comparator comparing said secondary direct voltage with said reference voltage and upon the presence of a voltage difference therebetween delivering an error voltage to said monostable oscillator means.

4. A direct voltage transformer device, comprising a DC–AC inverter means at the input side thereof for delivering a square-wave voltage output, a half-wave rectifier circuit arrangement for receiving said square-wave voltage output of said inverter means, said half-wave rectifier circuit arrangement comprising an input transformer means incorporating a primary winding and a secondary winding, a first rectifier element electrically coupled to one terminal of said secondary winding, a filter coil and capacitor filter electrically coupled with said secondary winding, a further transformer means having primary winding means and secondary winding means, said primary winding means providing said filter coil, rectifier circuit means electrically coupled with said secondary winding means of said further transformer means, said rectifier circuit means conducting during the blocking periods of said first rectifier element, said half-wave rectifier circuit arrangement further including a second rectifier element connected between the junction point of said first rectifier element and said filter coil and the other terminal of said secondary winding of said input transformer means, said second rectifier element blocking during the conductive periods of said first rectifier element.

* * * * *